Patented May 22, 1928.

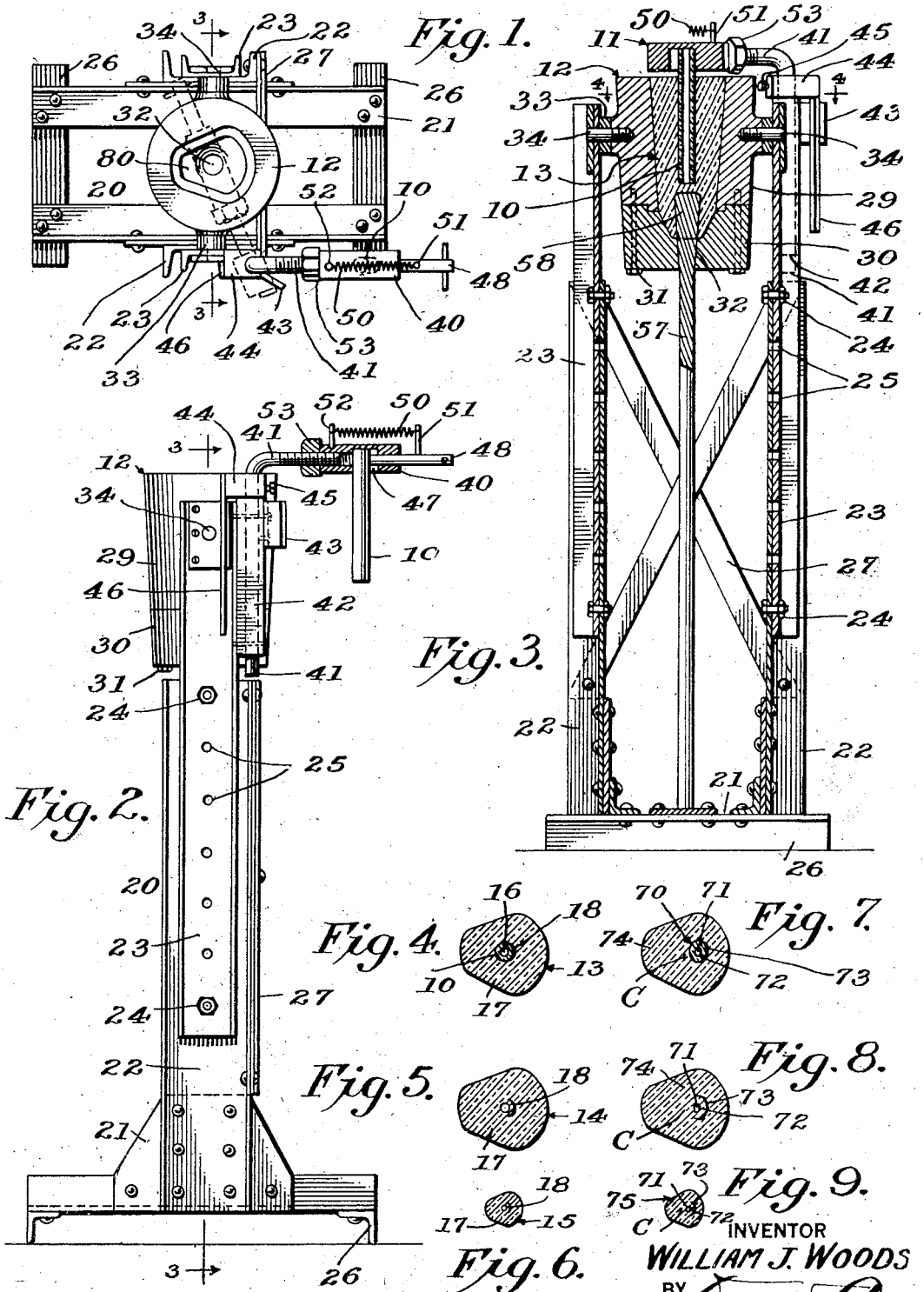

1,670,947

UNITED STATES PATENT OFFICE.

WILLIAM J. WOODS, OF CORNING, NEW YORK, ASSIGNOR TO CORNING GLASS WORKS, OF CORNING, NEW YORK, A CORPORATION OF NEW YORK.

METHOD OF AND APPARATUS FOR MAKING TUBING.

Application filed April 6, 1925. Serial No. 21,162.

This invention relates to the art of shaping glass, and more particularly to making glass tubing.

It is now customary to make tubing in four main ways: (a) By flowing it around a rotating mandrel; (b) by forming a blank by hand and then drawing it in a machine; (c) by forming a blank by hand and then drawing it by hand; and (d) by blowing it in a mold.

All tubing of other than one color glass, of very small bore, of other than circular cross-section or bore, and all thick-walled tubing, as well as some tubing of the foregoing kinds, is made by method (b), method (c), or method (d) because the rotating mandrel method is not adapted to the formation of tubing of this character. Method (d) is only practicable for making tubing of large diameter, which is often referred to as a cylinder. Consequently, all thermometer tubing, which customarily has a white stripe between the bore and the rear wall, as well as tubing having a special cross-section or bore, all miscellaneous striped tubing, and all thick-walled tubing, except such of the latter as is made by method (d), has had to be made from a hand formed blank. This, however, requires highly skilled labor and makes the tubing which is formed therefrom quite expensive. Furthermore, the bore in such tubing, while accurate enough for many purposes, is not sufficiently accurate for some purposes, such as burettes, syringe barrels, etc., and has to be reground or otherwise treated to overcome these inaccuracies.

It is therefore an object of this invention to provide a new and improved process of making glass tubing that will be cheaper than the present methods which require hand gathering.

It is another object to provide a method of making tubing of uniform and accurate predetermined cross-section without marvering or other special treatment.

It is a further object to provide a method of forming tubing with an accurate bore or bores of any predetermined size or shape, and located at any desired position in the finished tubing.

It is a still further object to provide a method of making tubing in which colored stripes of any desired character can be formed at predetermined locations in the finished tubing.

It is also an object to provide an apparatus for carrying out the above objects.

With the above and other objects in view, which will be apparent as the description proceeds, I have disclosed my invention in the following specification taken in connection with the accompanying drawings, in which:

Fig. 1 is a plan view of a suitable apparatus for carrying out my invention;

Fig. 2 is a side elevation of the apparatus shown in Fig. 1;

Fig. 3 is a transverse section on the line 3—3 of Figs. 1 and 2, but showing certain parts in a different relation and glass in the mold;

Fig. 4 is a transverse section through the molten glass shown in Fig. 3 on the line 4—4 thereof before the preformed tubing has become incorporated with the molten glass to form an integral blank;

Fig. 5 is a corresponding section through the glass shown in Fig. 3, after the preformed tubing has become incorporated with the molten glass and set to form the blank;

Fig. 6 is a transverse section through a piece of finished tubing drawn from the blank whose cross-section is shown in Fig. 5; and Figs. 7–9 are transverse sections corresponding to those shown in Figs. 4–6, but taken through masses of glass having a modified shape of bore, a bore placed at a different position in the glass, and a colored stripe interposed between the bore and a white stripe.

My invention consists in heating a piece of preformed tubing 10, attaching it to any suitable holder 11, and inserting it in a mold 12 filled with molten glass 13. The preformed tubing 10 then unites to the molten glass 13 and forms a blank 14 which is removed from the mold when it has set. It is then reheated and drawn into the tubing 15 in the regular manner. The preformed tubing 10 possesses the characteristics it is desired to have present in the finished tubing and is therefore provided with a bore 16 whose shape is the same as that of the bore in the tubing it is desired to form, and whose size is proportionate to the desired size of bore in the finished tubing, as well as any colored stripe or stripes it is desired to have present in the finished tubing.

As illustrated in Fig. 4, the body of the preformed tubing consists of clear glass 17, on one side of which there is a stripe of white glass 18, to form the white stripe which is usual in thermometer tubing. The molten glass 13 is shown as being clear glass and, after the adhesion of the preformed tubing thereto, the line of juncture is eliminated, as indicated in Fig. 5.

It will be apparent that the preformed tubing is inserted in the mold in a position corresponding to the desired location of the bore in the finished tubing, and that this can be varied at will.

In its simplest form the holder 11 may be a sticking up punty, and the mold 12 may be a stationary mold having the proper interior configuration to form the size and shape of blank desired. Then, as the glass starts to set, the sticking up punty may be replaced by the type of punty customarily used in drawing tubing.

In Figs. 1—3, however, I have disclosed a suitable and preferred form of apparatus for conveniently carrying out my new method. In these figures, 20 represents a suitable frame work consisting of a base member 21, a lower member 22 and an upper member 23. The members 22 and 23 may be of any desired shape but are herein shown as channel irons which are adjustably secured together by bolts 24 in mating openings 25 in the channel irons, whereby the height of the frame work may be altered as desired. The base member 21 has a series of angle irons 26 which are bolted or riveted together to form a unitary construction and are secured to the lower member 22. Crossed braces 27 are provided to secure the channel irons 22 firmly together.

The mold 12 is preferably assembled so as to simulate a one piece mold although, as shown herein, for convenience of manufacture it may be made of two or more parts such as the body 29 and bottom 30 which are secured together by the bolts 31. As indicated in Figs. 1 and 3, the bottom 30 is perforated at 32 for a purpose to be described hereinafter.

The mold 12 is provided with trunnions 33 and is secured to the frame work 20 by pivot pins 34 which pass through the frame work to enable the mold to be freely swung thereon.

The holder 11 is preferably of the type indicated in Figs. 1-3, and consists of a slotted block 40 which is threaded on a supporting arm 41 mounted in a suitable guide 42. The latter is preferably bolted or otherwise secured to one of the channel irons 23 adjacent its upper end and is provided with a stop 43 which is either integral with the guide or securely attached thereto. To limit the movement of the arm 41 in the guide 42 and to regulate the path of the arm 41 relative to the mold 12 I provide the arm with a collar 44 having a set screw 45, and with a projecting finger 46 for engagement with the channel iron 23 and the stop 43. By adjusting the arm to the desired position in collar 44, and tightening the set screw 45, the height and lateral position of the preformed tubing 10 can easily be adjusted with reference to the mold, since the descent of the collar is limited by its contact with the guide 42, and the lateral travel of the arm 41 is limited by the contact of finger 46 with channel iron 23 and stop 43.

To receive the preformed tubing 10 in the block 40, the latter is provided with a slot 47 of sufficient size to permit the reception of various sizes of tubing. The block is also provided with an adjustable stop 48 which is pulled inwardly by a spring 50 that is attached to pins 51 and 52 carried, respectively, by the stop 48 and the block 40. The spring 50 is of such a tension that it pulls the stop 48 into contact with the tubing 10 and holds the latter firmly against the inner side of the slot 47.

To conveniently regulate the radial position of the tubing 10 with reference to the contour of the mold, the block 40 and arm 41 are correspondingly threaded, thus permitting the block to be adjusted longitudinally of the projecting end of the arm. A lock nut 53 is provided to hold the block in adjusted position on the arm 41.

The operation of my apparatus, to carry out my new method of making tubing, is as follows:

A punty 57, provided with the usual enlarged head 58, is inserted in the perforation 32 in the bottom 30 of mold 12, its opposite end resting on the base 21, and mold 12 is substantially filled with molten glass 13. Stop 48 on the block 40 is pulled outwardly a sufficient distance to allow the insertion of the end of a piece of preformed and heated tubing 10, having the desired characteristics, and is then released, causing the tubing to be retained in the slot 47 by the pressure of the spring 50. Arm 41 is then lifted from the full line position indicated in Fig. 1 until it is high enough so that the tubing 10 will clear the mold 12, swung inwardly to the dotted line position (Fig. 1) where the tubing is above its desired position in the mold, and lowered thereinto. A section through the glass at this time is shown in Fig. 4, and a corresponding section, after the preformed tubing has become incorporated with the molten glass and the latter is set to form the blank, is shown in Fig. 5. As indicated in the latter figure, the clear glass then forms a homogeneous mass and the line of juncture is eliminated. When the glass has set to the desired point, the mold is tilted and the blank is removed by pushing outwardly on the punty 57. The blank is then ready to be drawn in the usual manner into the desired tubing 15, shown in cross-section in Fig. 6.

To form a stripe or stripes of colored glass in the finished tubing it is only necessary to start with a piece of preformed tubing having the desired stripe or stripes therein, of a size proportionate to the desired size of the finished tubing, and the stripe or stripes will be imparted to the finished tubing in the manner indicated above. Furthermore, by suitably choosing the shape and size of the bore of the preformed tubing, the resulting tubing will have a bore of the shape and size desired.

In Figs. 7–9, I have illustrated three steps in the manufacture of such a modified form of tubing. In Fig. 7, 70 designates the preformed tubing which is shown as being of oval cross-section and provided with an oval bore 71, the preformed tubing being inserted in the mold in such a position that the bore 71 will be back of the center C of the blank. The preformed tubing is also provided with a stripe of colored glass 72, for example red, adjacent to the bore and forming part of the wall thereof, and with a stripe of white glass 73 such as is customary in thermometer tubing. This is shown as embedded in clear glass 74, corresponding to the glass forming the body of the preformed tubing, in a position back of the center C of the mass of glass 74, to increase the magnification of the indicating liquid which will be used in the finished thermometer. In Fig. 8 there is indicated a corresponding section through the glass 74 after the preformed tubing has become incorporated with the molten glass and the line of juncture eliminated. This is then drawn into the finished tubing 75, a section through which is indicated in Fig. 9. As indicated in this figure, the bore 71 of the finished tubing is oval and is back of the center C of the finished tubing 75, a colored stripe 72 forms part of the wall of the bore, and an additional stripe 73 is interposed between the stripe 72 and the outer surface of the tubing.

It will be apparent that the stripe of white or other color glass may be applied to a preformed section of clear tubing prior to its insertion in the mold of molten glass, but a more uniform result is obtained by using preformed tubing which contains a stripe that was drawn as an integral part thereof when the preformed tubing was drawn.

I have herein shown the mold 12 as provided with a cavity 80 which is of such a shape that it will give the blank a shape suitable for forming the familiar lens front tubing. It will be understood that in the formation of round or other shaped tubing the cavity 80 will be modified accordingly.

It will therefore be apparent that my method results in the production of a superior grade of tubing, owing to the fact that the bore is accurate and uniform, being determined by the shape and size of the bore in the preformed tubing instead of by the individual blowing of the bore in each blank. It also results in a much simpler and cheaper method of forming the tubing, since the blanks can be made by relatively unskilled labor instead of the highly paid labor which is required to successfully gather and marver the glass in the present method of making the blanks, and provides a simple and effective way of imparting special configurations, such as that required for forming lens front tubing, to the exterior of the blank without a marvering operation.

Other modifications in my new method and apparatus, within the scope of the following claims, will occur to those skilled in the art.

I claim:

1. The method of making tubing which comprises the steps of heating a piece of previously drawn tubing, inserting it in a mass of molten glass, and drawing the blank thus formed into tubing of the desired size.

2. The method of making tubing which comprises the steps of heating a piece of previously drawn tubing, attaching to a holder, inserting this tubing in a mass of molten glass, and drawing the blank thus formed into tubing of the desired size.

3. The method of making tubing which comprises the steps of heating a piece of preformed tubing, attaching it to a holder, supplying a charge of molten glass to a mold whose configuration conforms to the desired shape of the blank, inserting the tubing in this molten glass, allowing it to set, and drawing the blank thus formed into tubing of the desired size.

4. The method of making tubing which comprises the steps of heating a piece of preformed tubing, attaching it to a holder, supplying a charge of molten glass to a mold whose configuration conforms to the desired shape of the blank, inserting the tubing in this molten glass, leaving the preformed tubing in the molten glass in the mold until the former has become incorporated with the latter and the latter has set, and drawing the blank thus formed into tubing of the desired size.

5. The method of making lens front tubing which comprises the steps of heating a piece of preformed tubing, attaching it to a holder, supplying a charge of molten glass to a mold having a shape corresponding to the proper shape of a blank for forming lens front tubing, inserting the tubing in this glass, and drawing the blank thus formed into tubing of the desired size.

6. The method of making striped tubing which comprises the steps of heating a piece of previously drawn tubing containing a stripe of the desired character, attaching it to a holder, inserting this tubing in a mass of molten glass, and drawing the blank thus formed into tubing of the desired size.

7. The method of making tubing having a predetermined and accurate bore which comprises the steps of heating a piece of previously drawn tubing containing a bore of the same shape as that desired in the finished tubing, but of a size sufficiently larger than that of the finished bore to allow for the subsequent drawing, inserting this preformed tubing in a mass of molten glass, and drawing the blank thus formed into tubing of the desired size.

8. An apparatus for use in making tubing, comprising a mold provided with a cavity of the shape of the desired blank, and means for suspending a piece of previously drawn tubing therein.

9. An apparatus for use in making tubing, comprising a mold provided with a cavity of the shape of the desired blank, means for supporting a piece of preformed tubing therein, and means for regulating the position of the preformed tubing in the mold cavity so it will be incorporated in the finished tubing blank at the position it is desired to have the bore occupy.

10. An apparatus for making tubing blanks, comprising a mold provided with a cavity of the shape of the desired blank, means for exposing the head of a punty in the mold, and means independent of the punty for supporting a piece of previously drawn tubing therein.

11. An apparatus for making tubing blanks, comprising a mold provided with a cavity of the shape of the desired blank, means for exposing the head of a punty in the mold, means for supporting a piece of preformed tubing therein, and means for regulating the position of the preformed tubing in the mold cavity.

12. An apparatus for making tubing blanks, comprising a frame work, a mold supported thereby, a recess in the mold, a punty inserted through said recess with its head exposed in the mold, a holder for supporting a piece of preformed tubing, and means for regulating the position of the preformed tubing with reference to the cavity in the mold.

13. An apparatus for making tubing blanks, comprising a frame work, a mold supported thereby, a recess in the mold, a punty inserted through said recess with its head exposed in the mold, a holder for supporting a piece of preformed tubing, means for controlling the position of the holder with reference to the mold, and means for adjusting the position of the preformed tubing with reference to the cavity in the mold.

14. An apparatus for making tubing blanks, comprising a frame work, a mold pivotally supported thereby, a recess in the mold, a punty inserted through said recess with its head exposed in the mold, a holder for supporting a piece of preformed tubing, and means for regulating the position of the preformed tubing with reference to the cavity in the mold.

15. An apparatus for use in making tubing, comprising a mold, a frame work supporting the mold, a holder to support a piece of preformer tubing, and means to permit the raising, lowering and swinging of the holder.

16. An apparatus for use in making tubing, comprising a mold, a frame work supporting the mold, a holder to support a piece of preformed tubing, means to permit the raising, lowering and swinging of the holder, and means for adjusting the position of the holder with reference to said other means.

17. An apparatus for use in making tubing, comprising a mold, a frame work supporting the mold, a holder to support a piece of preformed tubing, means to permit the raising, lowering and swinging of the holder, and means for limiting the lateral and downward movement of the holder.

18. An apparatus for use in making tubing, comprising a mold, a frame work supporting the mold, a holder to support a piece of preformed tubing, said holder being provided with resilient means for retaining the tubing therein, and means to permit the raising, lowering and swinging of the holder.

19. The method of making tubing which consists in gathering glass on the end of a blow pipe, shaping it into a blank, drawing it out into tubing, inserting a predetermined length of said tubing into a mold, filling the remainder of said mold with molten glass, and drawing the blank thus formed into tubing of the desired cross section.

WILLIAM J. WOODS.